United States Patent
Miyayama et al.

[11] Patent Number: 5,828,861
[45] Date of Patent: Oct. 27, 1998

[54] SYSTEM AND METHOD FOR REDUCING THE CRITICAL PATH IN MEMORY CONTROL UNIT AND INPUT/OUTPUT CONTROL UNIT OPERATIONS

[75] Inventors: Yoshiyuki Miyayama, Santa Clara; Cheng-Long Tang, San Jose, both of Calif.

[73] Assignee: Seiko Epson Corporation, Tokyo, Japan

[21] Appl. No.: 846,231

[22] Filed: Mar. 6, 1992

[51] Int. Cl.⁶ ............................................. G06F 9/00
[52] U.S. Cl. ............................................. 395/384
[58] Field of Search .................................. 395/325, 375, 395/425

[56] References Cited

U.S. PATENT DOCUMENTS

| | | | |
|---|---|---|---|
| 4,701,841 | 10/1987 | Goodrich et al. | 395/325 |
| 4,757,439 | 7/1988 | Stinson et al. | 395/425 |
| 4,764,866 | 8/1988 | Downey | 395/375 |
| 4,819,203 | 4/1989 | Shiroyanagi et al. | 395/325 |
| 5,003,465 | 3/1991 | Chisholm et al. | 395/275 |

FOREIGN PATENT DOCUMENTS 0184320  6/1986  European Pat. Off. .

OTHER PUBLICATIONS

Joseph P. Altnether, "Better Processor Performance Via Global Memory", *Computer Design*, pp. 155–164, Jan. 1982.

*Primary Examiner*—Kevin J. Teska
*Assistant Examiner*—Ayni Mohamed
*Attorney, Agent, or Firm*—Sterne, Kessler, Goldstein & Fox PLLC

[57] ABSTRACT

A system and method for eliminating the critical path of a processor-based system by sending a signal to transition memory and/or I/O control units to a READ/WRITE state prior to the end of the complete instruction decode. If the decoding phase of the opcode of the instruction reveals that a read-write step is to be carried out wherein memory or an I/O device must be accessed, the processor immediately sends a read-write request to the memory control unit and the I/O control unit prior to decoding the balance of the instruction. Once the balance of the instruction has been decoded and the access location is determined to be in either memory or an I/O device, a cancellation process takes place. In this cancellation process, if the access location is in memory, the I/O unit transitions from the read-write state to an idle state. If, however, the access destination is determined to be an I/O device, the memory control unit transitions from the read-write state to the idle state.

9 Claims, 6 Drawing Sheets

SYSTEM AND METHOD FOR REDUCING THE CRITICAL PATH IN MEMORY CONTROL UNIT AND INPUT/OUTPUT CONTROL UNIT OPERATIONS

BACKGROUND OF THE INVENTION

1. Field of the Invention

The present invention relates generally to the field of microprocessor-based systems, and more particularly, to a system and method for sending simultaneous READ/WRITE requests to at least two subsystems and subsequently canceling the request not needed.

2. Discussion of Related Art

A typical computer-based microprocessor system consists of three major subsystems: a main memory, one or more internal processing units (IPU) and an input-output (I/O) subsystem. Some conventional microprocessor-based systems use a method known as pipelining as a way to increase performance. In pipelining operations, various steps of instruction execution (e.g. fetch, decode and execute) are performed by independent units called pipeline stages. The steps are performed in parallel in the various stages so that the processor can handle more than one instruction at a time.

The throughput of the pipeline is determined by how often an instruction exits the pipeline. Because the pipeline stages are hooked together, all stages must be ready to proceed at the same time. The time required to move an instruction one step along the pipeline is a processor cycle time. However, in the real world, some of the steps of fetch, decode and execute take longer than others, thereby not allowing true parallelism in execution. Therefore, the shortest amount of time allotted to a cycle time is the time it takes to perform the longest step. Alternatively, that step can be performed in multiple cycle times. In either case, the efficiency of the system is hindered by the longest step.

For a more in depth discussion of pipelining, see Hennessy et al., *Computer Architecture a Quantitative Approach,* Morgan Kaufmann Publishers (1990).

During operation of a source program, the IPU will need to access data in main memory or in I/O space. In general, the IPU is the fastest element of a microprocessor-based system, with processor cycle times of tens of nanoseconds. On the other hand, the main memory and I/O device access have cycle times on the order of hundreds of nanoseconds. Therefore, a limiting factor in microprocessor performance will be the speed of memory access.

In conventional systems, early in the instruction decode phase, the processor knows if an I/O or memory access is to take place. But, until the balance of the instruction is completely decoded, the system can not determine whether it is the main memory or the I/O device that will need to be accessed. Conventional systems decode the entire instruction including the OPCODE and the Register Address portions prior to sending a command to a memory control unit (MCU) or I/O control unit (IOU) to transition to the READ/WRITE state. In other words, conventional systems perform these operations serially, and the steps of complete instruction decode and transitioning the MCU or IOU to the READ/WRITE state are on the "critical path." Consequently, conventional systems waste valuable time waiting for the system to fully decode the instruction before undertaking the time-consuming step of actually accessing the memory or the I/O device.

In typical clocking operations, the system clock has what is known as a slave state. It is only during this slave state that slave devices such as MCU and IOU are granted access to the bus to perform operations such as READ/WRITE. The clock cycle time, therefore, must be long enough to allow all the operations on the critical path to be performed so that the device to be accessed can be put into the READ/WRITE state in time for the upcoming slave cycle. If the clock cycle time is decreased such that all the operations on the critical path cannot be performed in that time, the READ/WRITE operation misses the upcoming slave cycle and must wait an additional clock period for the next slave cycle.

Thus, what is needed is a system and method for allowing the processor to make a request for a read or write to memory as soon as the OPCODE is decoded, without waiting for the actual addresses to be accessed are decoded. This would reduce the critical path length by removing the READ/WRITE request from the critical path to a parallel path. In this manner, the system clock rate can be increased and the effective memory and I/O subsystem latencies are reduced.

SUMMARY OF THE INVENTION

The present invention provides a system and method for eliminating the critical path in a processor-based system. In the technique of the present invention, when the operation code of an instruction is decoded and that operation code calls for an operation requiring access of system memory or I/O devices, a read-write request is immediately sent to both a memory control unit MCU and an I/O control unit IOU of the processor-based system. This read-write request is sent prior to the processor decoding the balance of the instruction, thereby allowing the MCU and the IOU to transition from an idle state to a read-write state prior to the end of the current clock.

This technique allows the clock cycle time to be minimized to the amount of time that it takes for the processor to decode the current instruction. No additional time is required in the current clock cycle time to allow the MCU and the IOU to transition to the read-write state because they are already there.

Once the balance of the instruction has been decoded and the addresses for memory access or I/O access have been calculated and an MCU or an IOU destination has been decoded, a cancellation process takes place. In the cancellation process, either the MCU or the IOU transitions from the read-write state back to the idle state. If the destination decode revealed that the memory was to be accessed, the IOU transitions back to the idle state. If, on the other hand, the destination decode reveals that an I/O device was to be accessed, the MCU returns to the idle state.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

Environment

Figure 1:
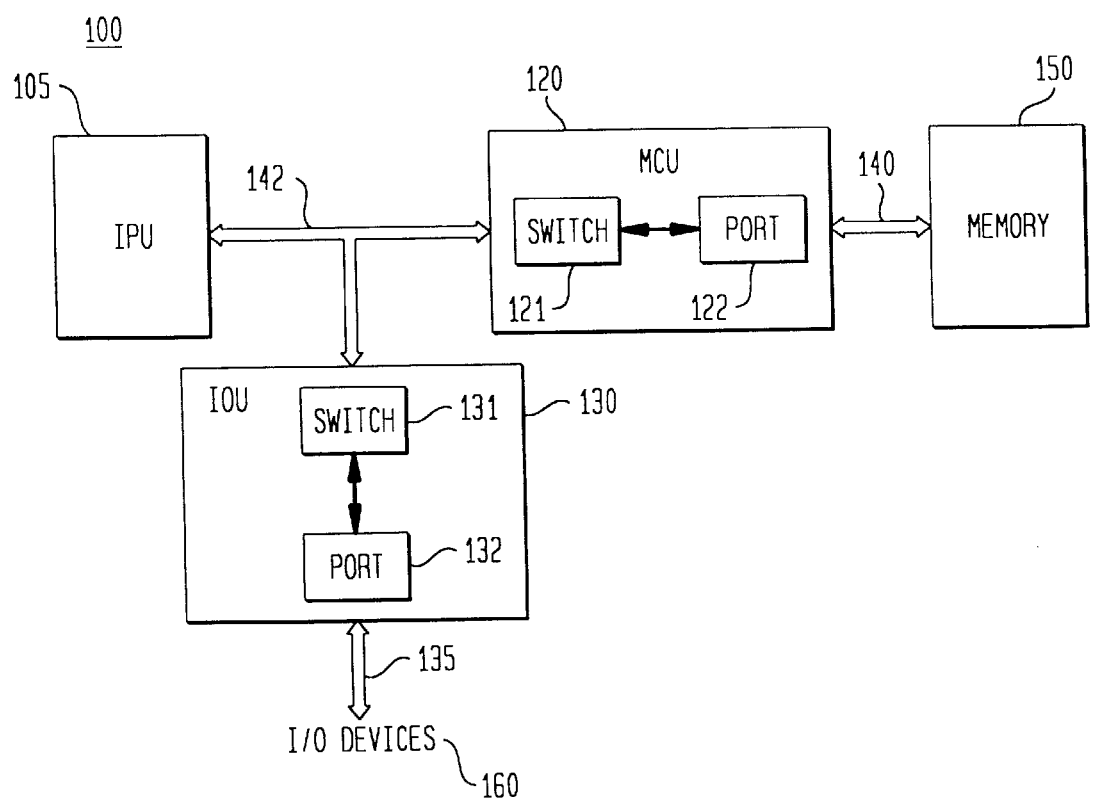
FIG. 1 is a general block diagram of the system architecture 100 of the present invention.

FIG. 1 illustrates a high-level diagram of a microprocessor architecture 100 representative of that to which the present invention may be applied. Referring to FIG. 1, there is provided in accordance with a preferred embodiment of the present invention a microprocessor system architecture designated generally as 100. System architecture 100 includes an Internal Processor Unit (IPU) 110, Memory Control Unit (MCU) 120, I/O Control Unit (IOU) 130, main memory 150, and external I/O devices 160.

Memory 150 is connected to MCU 120 by a memory bus 140 which, in the preferred embodiment, is 32 bits wide. Similarly I/O devices 160 are connected to IOU 130 by an external I/O bus 135 which is also 32 bits wide in the preferred embodiment.

MCU 120 is a circuit controlling read and write operations between IPU 105 and main memory 150. MCU 120 of a preferred embodiment of the present invention comprises a switch network 121 and a port 122. Although only one port 122 is shown in this example, a preferred embodiment of the present invention has multiple ports 122.

Switch network 121 provides the communications interface between MCU 120 and IPU 105. Switch network 121 is also used as a means of arbitrating port 122 requests. Port(s) 122 are responsible for sending data to and receiving data from main memory 150.

The function of switch network 121 is to receive the various instruction and data requests from IPU 105 and IOU 130. IPU 105 and IOU 130 may be referred to as memory requesters. After receiving and arbitrating these requests, the requests are passed to the appropriate memory port 122. Determination of the appropriate port 122 is made by interpretation of the instruction address. The port(s) 122 then generate the necessary timing signals, and send data to or receive data from the addressed portion of external memory 150.

IOU 130 is a circuit controlling read and write operations between IPU 105 and I/O devices 160. IOU 130 of a preferred embodiment of the present invention comprises a switch network 131 and a port 132. Although only one port 132 is shown in this example, a preferred embodiment of the present invention has multiple ports 132.

Analogous to the case with the MCU, Switch network 131 of IOU 130 provides the communications interface between IOU 130 and IPU 105. Switch network 131 is used as a means of arbitrating the IPU 105 and port 132 requests. Port(s) 132 are responsible for sending data to and receiving data from I/O devices 160.

Figure 2:
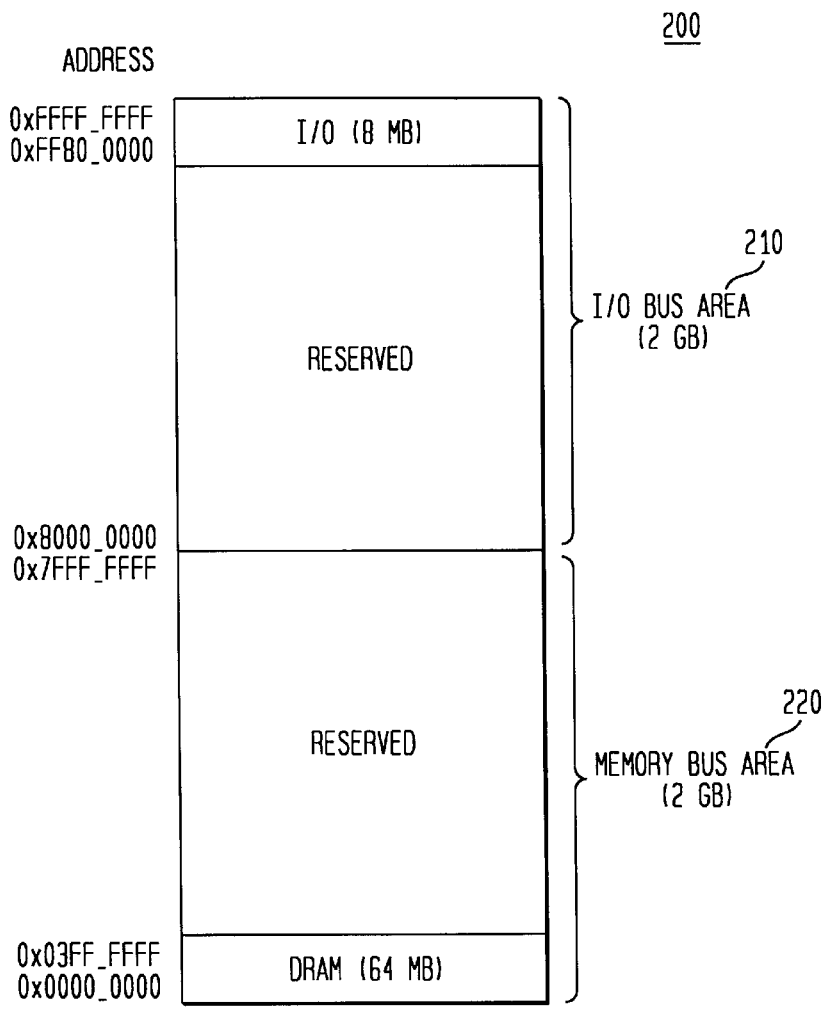
FIG. 2 is a system memory map.

FIG. 2 illustrates the organization of system memory. In a preferred embodiment memory organization is divided into two areas. There is provided an I/O BUS area 210 and a Memory BUS area 220. As a result of this organization, the system is able to request read and write operations for both main memory 150 and I/O devices 160. Each instruction that contains a read or a write operation will contain an address that can be mapped onto system memory map 200.

In a preferred embodiment of the present invention, instruction processing is divided into a three-stage pipeline. These are fetch, decode, and execute. Initially the instruction is fetched from memory by IPU 105. Second, the instruction is decoded to determine the function dictated (e.g., add, subtract, store). Third, and lastly, the decoded instruction is executed according to its function.

When encoding the instructions, the number of registers and the number of addressing modes both have a significant impact on the size of instructions. This is because the addressing mode field and the register field may appear many times in a single instruction. In fact, for most instructions many more bits are consumed by encoding addressing modes and register fields than in specifying the opcode. Since the addressing modes and register fields make up such a large percentage of the instruction bits, their encoding will significantly affect how easy it is for an implementation to decode the instructions.

Figure 3A:
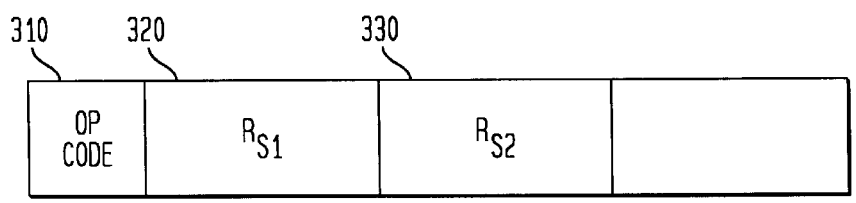
FIG. 3A is an illustration of a typical instruction format.

Instructions are often partitioned into several sections. FIG. 3A illustrates an example of an instruction and its component parts. Referring to FIG. 3A, an instruction 300 contains an OPCODE 310. OPCODE 310, once decoded, tells the processor which operation to execute. The operations can include arithmetic operations such as ADD, COMPARE, and CLEAR, control operations such as BRANCH and JUMP, system operations such as RETURN FROM INTERRUPT, and data transfer operations such as MOVE and PUSH.

Register, memory, and/or I/O device addresses are contained in the instruction, when required, to tell the processor on what locations to operate. These are encoded into the instruction at locations 320, 330. If, for example, the OPCODE 310 instructs the processor to perform an ADD operation, the processor looks to locations 320 and 330 and decodes the information therein to determine the addresses containing the values to be added (for direct addressing).

The actual format of the instruction 300 varies depending on the system architecture. It will be obvious to one skilled in the art how the techniques of the present invention can be applied to other instruction formats.

Figure 3B:
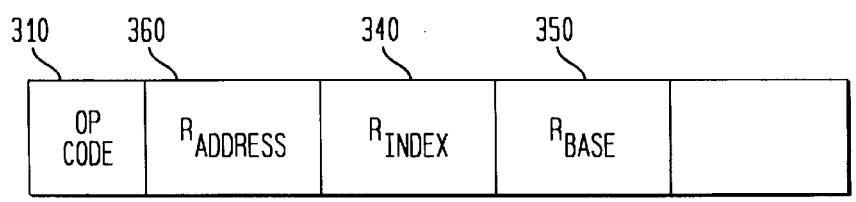
FIG. 3B is an illustration of a typical instruction format wherein one address is calculated using the results of an operation on two registers.

FIG. 3B illustrates an instruction format for a slightly more complex architecture. Referring to FIG. 3B, OPCODE 310 can instruct the processor to perform the same types of operations as discussed with regard to the format shown in FIG. 3A. Here, however, the addresses are arrived at differently. In this format the first address is computed by decoding and operating on two addresses. To calculate the first address, the processor decodes Rindex 340 and Rbase 350. The values at these locations are operated on (in this case added together) to determine the actual address. This type of architecture is useful for many types of programming. To calculate a second address, where required, the value at a location Raddress 360 is simply decoded.

The instruction decode portion of the pipeline can be broken down into several phases. Different parts of the instruction, i.e, OPCODE 310, Rindex 340, Rbase 350, and Raddress 360, can be decoded at different intervals. Thus, the processor can decode OPCODE 310 first, prior to decoding the balance of the instruction. Once the OPCODE 310 portion of the instruction is decoded, the processor knows what action the instruction is going to require.

Thus, if decoded OPCODE 310 tells IPU 105 that the instruction is an ADD or a COMPARE, for example, the processor knows that it will have to access the values on which to operate from another location. Referring to FIGS. 1 and 3B, a typical scenario for conventional systems will be described. The instruction is fetched and OPCODE 310 is decoded. If OPCODE 310 instructs the processor to perform a LOAD/STORE operation, IPU 105 decodes Raddress 360 to determine the location of the value to be stored. IPU 105 then decodes Rindex 340 and Rbase 350. Once decoded, Rindex 340 and Rbase 350 are sent to an adder to calculate the final address of the data. This final address is then sent to MCU 120 and/or IOU 130 to be decoded. Once decoded, either MCU 120 or IOU 130, whichever is to perform the READ/WRITE is transitioned to a READ/WRITE state. However, there may not be enough time within the current clock phase to perform all of these operations serially and still allow the appropriate unit to transition to the READ/WRITE state in time for the upcoming slave clock phase. Since the slave clock phase is the only phase during which READ/WRITE operations may occur, if the first slave phase is missed the system must wait one full clock period until the next slave phase. Therefore, since all of these operations are performed serially, and for fast clock rates the serial combination time causes the first subsequent slave phase to be missed, a critical path is said to exist. Alternatively, the system clock cycle time must be increased to allow all phases on the path to be completed. This alternative, however, is not a desirable solution to the problem because it results in slower operation.

Figure 4:
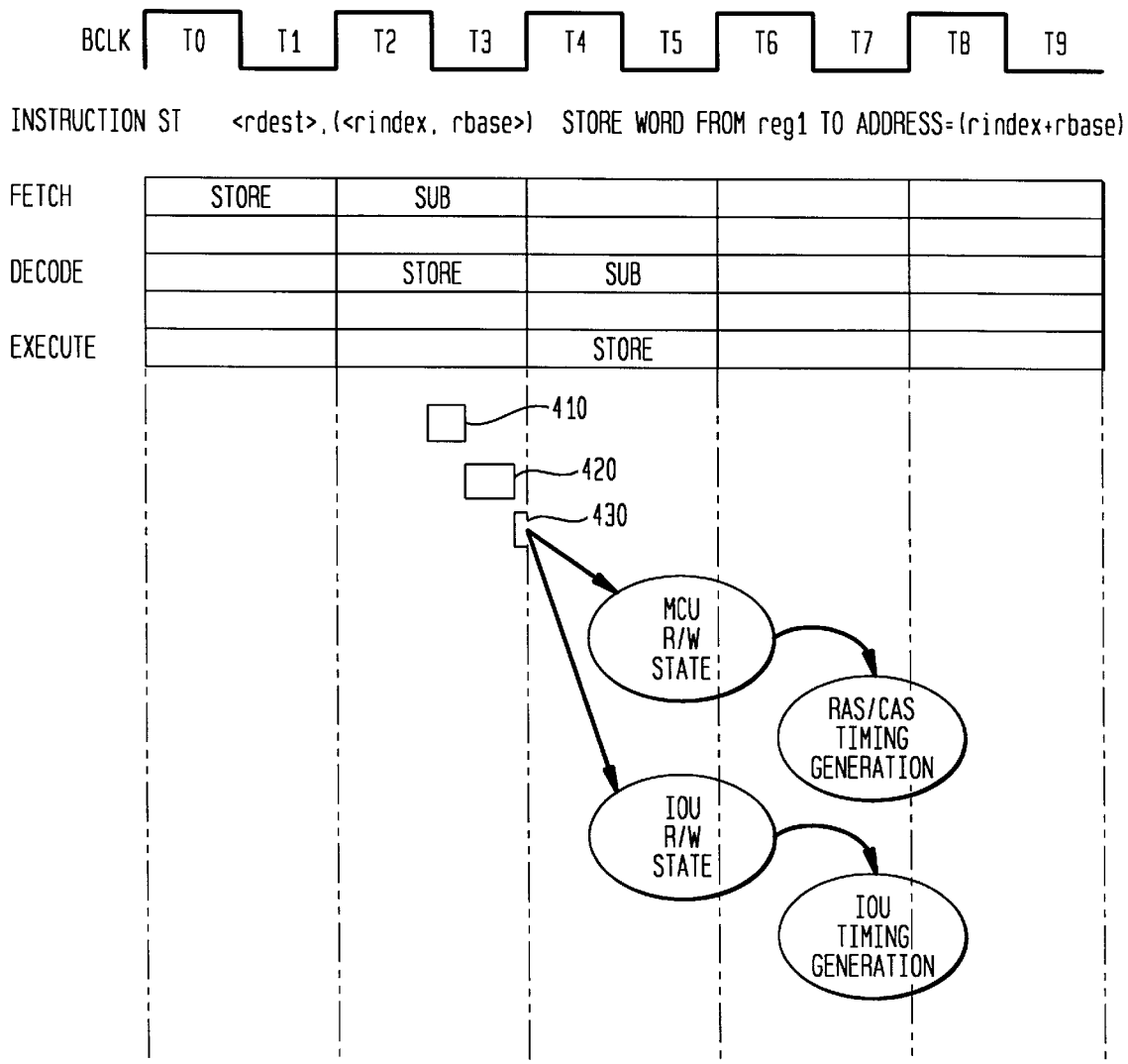
FIG. 4 is a state operation flow diagram of a conventional system with all operations on the critical path.

FIG. 4 illustrates a timing diagram and state diagram of the LOAD/STORE scenario described above for conventional systems. The operational times given below are provided by way of example. Other machines will, of course, have different operational times associated with instruction processing. Referring to FIG. 4, in the first clock period T2/T1, the LOAD/STORE instruction is FETCHED. In a second clock period T2/T3, the instruction is decoded. That is OPCODE 310 is decoded, then Raddress 360, Rindex 340 and Rbase 350 are decoded. Rindex 340 and Rbase 350 are decoded during the T3 clock phase. This process takes approximately 8 nanoseconds and is indicated by block 410. Once this is completed, the address calculation is performed. The time required for this calculation is 7 nanoseconds as represented in block 420. After the address calculation is performed, the address has to be decoded by MCU 120 or IOU 130. This decoding, represented by block 430, takes 4–5 nanoseconds. Therefore, the total instruction decoding time is 20 nanoseconds.

After the address is decoded in block 430, the appropriate control unit, either MCU 120 or IOU 130, must be put into a READ/WRITE state before the next slave state. In FIG. 4, T4, T6, T8, etc. are slave states, i.e., the only states during which a memory or I/O READ/WRITE can take place. Since the instruction and address decoding operations consumed 20 nanoseconds of clock time in the previous T3, and we want the READ/WRITE to take place in T4, the upcoming slave phase, the clock phase time must be greater than 20 nanoseconds. The amount of time required beyond the 20 nanoseconds is the amount of time it takes to transition the appropriate control unit, MCU 120 or IOU 130 into the READ/WRITE state. If the phase time is not sufficient, MCU 120 or IOU 130 will not be in the READ/WRITE state in time for the T4 clock phase, a critical path exists, and the system must wait until the T6 clock phase to perform the READ/WRITE operation.

Thus, the deficiency of conventional systems is that the instruction decode operations and the transition of the memory or I/O device to a READ/WRITE state occur serially and form a critical path for fast clock rates. This results in either an increased clock cycle time (slower clock rate) or a 'wasted' clock period during which READ/WRITE operations must be postponed. This latter result means that the instruction in question will not complete its execution until one clock period later, i.e., the next pipeline.

THE INVENTION

Figure 5:
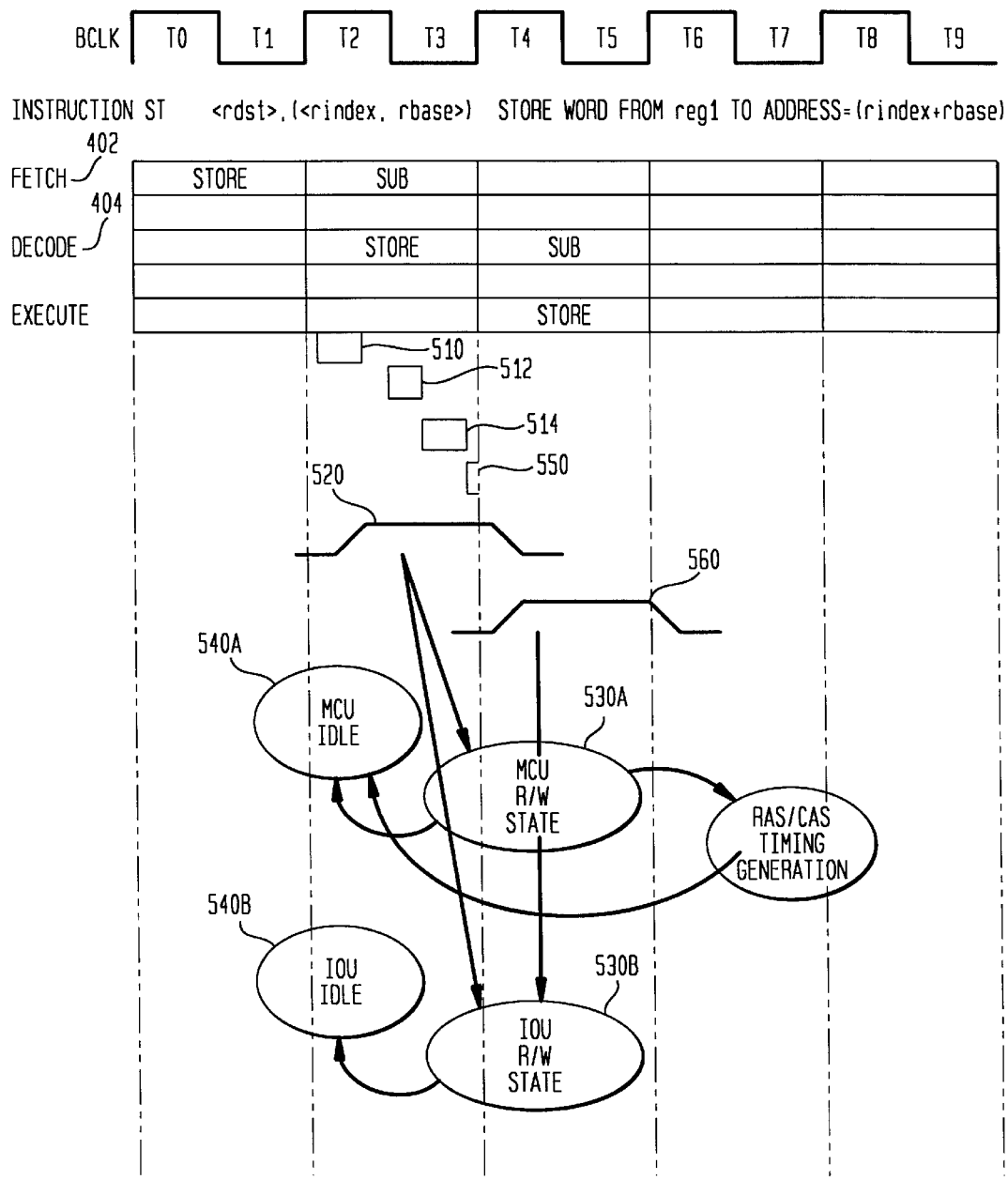
FIG. 5 is a state diagram illustrating an example of the technique of the present invention.

The present invention eliminates this critical path deficiency by transitioning MCU 120 and IOU 130 into the READ/WRITE state prior to the address decode operation. In other words, the step of transitioning from the idle state to the READ/WRITE state is removed from the critical path. FIG. 5 is a timing and state diagram which illustrates operation of the present invention. Referring to FIGS. 3B and 5, if decoded OPCODE 310 indicates that a READ/WRITE operation to memory or an I/O device must take place, an IPU 105 READ/WRITE request 520 is sent in parallel to MCU 120 and IOU 130 immediately upon decode of OPCODE 310. IPU 105 does not wait until the other registers are decoded. In this manner, MCU 120 and IOU 130 are taken out of the IDLE state 540 and put into the READ/WRITE state 530 during the T3 clock time, at the same time the rest of the instruction is being decoded. Therefore, the operation of transitioning to a READ/WRITE state is no longer serial and no longer causes the system to have to wait for the T6 phase to occur—the critical path is eliminated. Now, both MCU 120 and IOU 130 are in the READ/WRITE state 530 prior to the occurrence of the slave T4 clock phase.

This concept can be illustrated using the same timing numbers as mentioned in the above discussion on conventional systems. If, for example, the time required for decoding the registers, calculating the address and decoding the address takes 20 nanoseconds or less, no critical path exists for systems using clocks as fast as 20 nanoseconds because the IOU 130 and MCU 120 are already in the READ/WRITE state prior to the occurrence of T4.

Once the destination is decoded, and it is known which of MCU 120 and IOU 130 are required, a IOU cancellation signal 560 is generated, thus returning the unit not required to the idle state.

Referring again to FIGS. 3B and 5, the OPCODE 310 decode occurs early in the T2/T3 clock period as illustrated by block 510. Immediately upon conclusion of this decode, an IPU READ/WRITE request 520 is sent to MCU 120 and IOU 130. Request 520 puts MCU 120 into a READ/WRITE state 530A and IOU 130 into a READ/WRITE state 530B. Now both READ/WRITE states 530 have occurred in time to be utilized during the T4 slave clock phase.

Contemporaneous with the READ/WRITE request, the remainder of the instruction is decoded to determine the appropriate addresses. The decoding of Rindex 340 and Rbase 350 is illustrated in a block 512. The calculation of the address to be accessed, i.e., the addition of Rindex 340 to Rbase 350 is illustrated by block 514.

One of the units, either MCU 120 or IOU 130, will be performing the READ/WRITE operation and the other will not. It is not known which is which until the address decode takes place as represented by block 550. Once the address decode occurs, an IOU cancellation signal 560 is generated thus cancelling the unit that will not be performing the READ/WRITE operation. This unit can will now return to an IDLE state 540.

In the example illustrated by FIG. 5, the address to be accessed happens to reside in memory. Therefore, when the addresses are decoded, it is learned that I/O devices are not to be accessed. A cancellation signal 560 is then generated and IOU 130 returns to idle state 540B. MCU 120 remains in READ/WRITE state 530A, and the memory access occurs.

In a preferred embodiment, MCU 120 decodes the address calculated by IPU 105. Once the address is decoded and it is known whether the address points to memory 150 or 1/0 160, MCU 120 then either cancels its own READ/WRITE request and returns to idle state 540A, or sends a cancellation signal to IOU 130. It will be obvious to those skilled in the art that this address decode may be performed in either MCU 120, IOU 130, or both.

Figure 6:
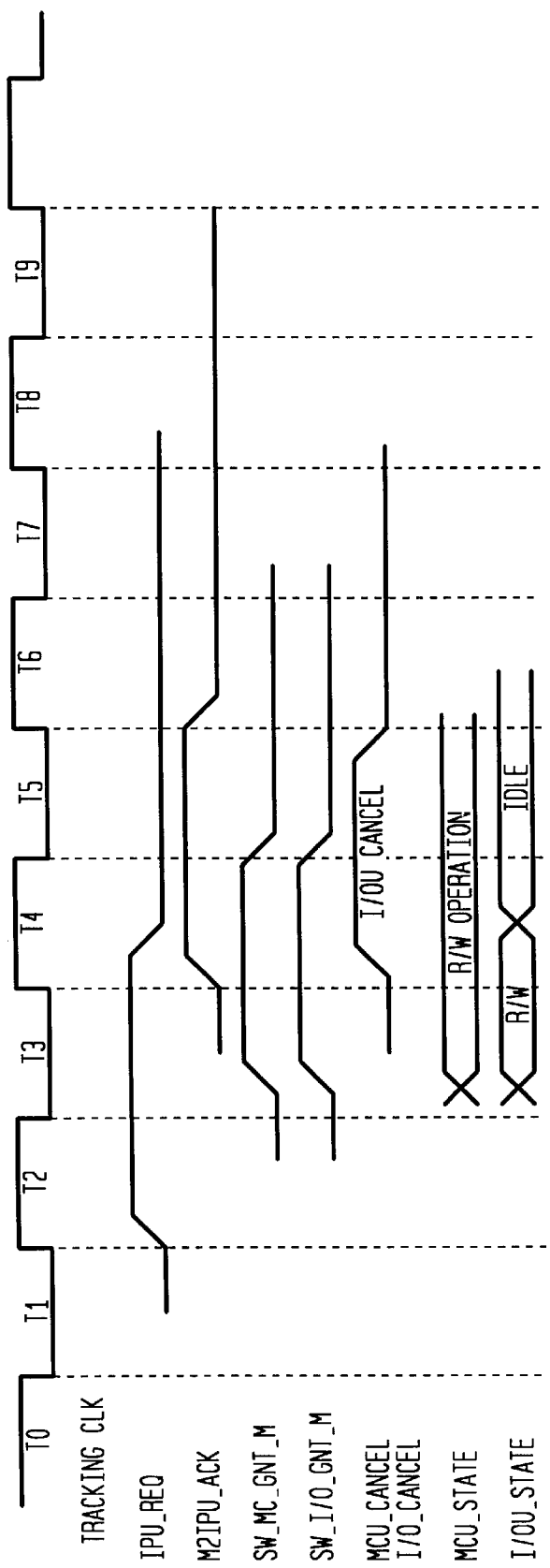
FIG. 6 is a timing diagram for the IOU cancellation procedure of the present invention.

A timing diagram of the technique of this invention is illustrated in FIG. 6. Referring now to FIG. 6, an IPU_REQ signal 520 is sent to both MCU 120 and IOU 130. MCU 120 responds with a grant signal 610A and IOU 130 responds with a grant signal 610B. Both MCU 120 and IOU 130 are now in the READ/WRITE state as shown by MCU_STATE 620A and IOU_STATE 620B. Once the address is decoded, an MCU/ICU_CANCEL signal is generated to cancel the unit, either MCU 120 or IOU 130, that is not needed. FIG. 6 illustrates the case where it is IOU 130 that is not needed and therefore, ICU_STATE 620B returns to the idle condition.

Figure 7:
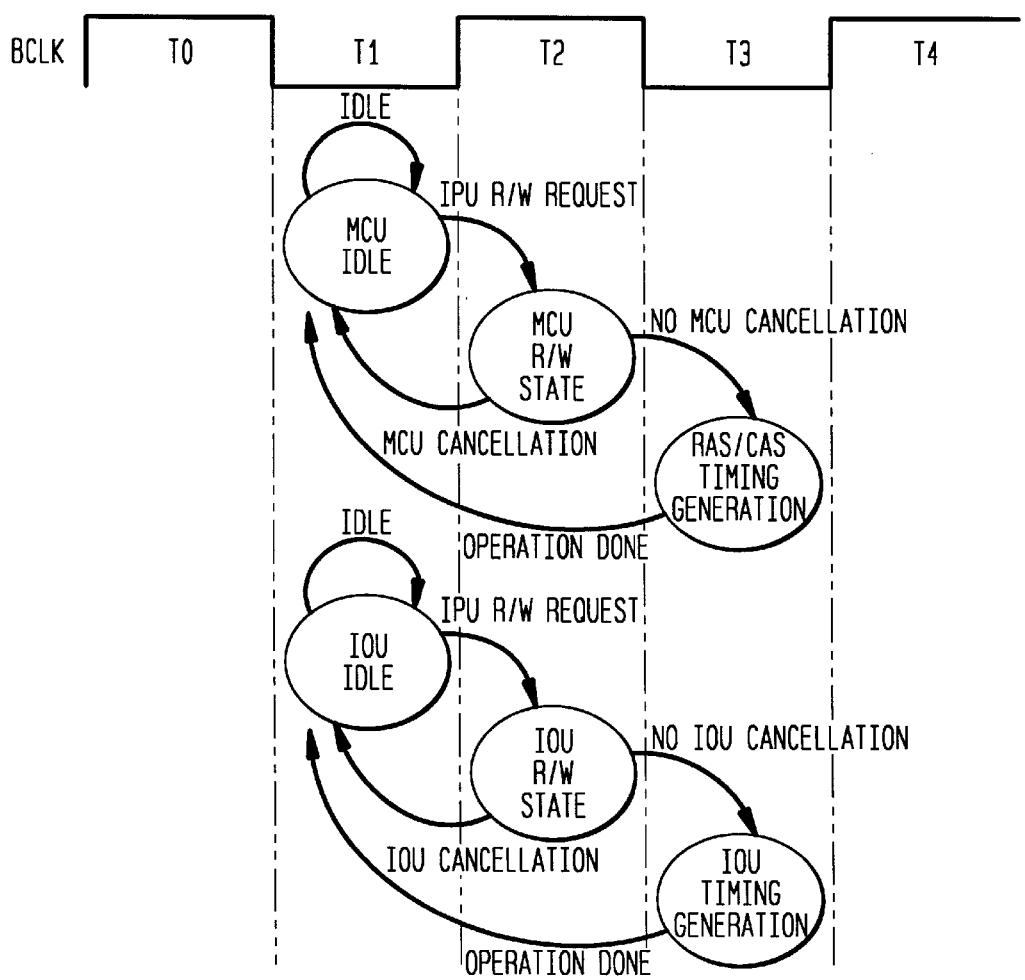
FIG. 7 is a state diagram illustrating the technique of the present invention.

FIG. 7 illustrates the states of MCU 120 and IOU 130. Referring to FIGS. 7 and 2, a state machine that is used to generate the cancellation logic block is shown. There is cancellation logic in both the MCU 120 and IOU 130. The two state machines will start simultaneously when they receive the read/write request signal from IPU 105 at $T_1$. After decoding the destination of the request (i.e., the address in memory as indicated in the instruction currently being decoded), either MCU 120 or IOU 130 will generate cancel signals at $T_2$ from switch 125 or switch 135, respectively, to cancel its operation. If the request is canceled the control unit with the cancellation will go back to an idle state. If the request is not canceled then the control unit will begin to access the appropriate memory locations.

The cancel signal is triggered by examining the 31st bit of the instruction. If the bit is a zero then the request is for main memory and if the bit is a one then the request is for an I/O device. As illustrated in FIG. 2, if the address is between 0000_0000 and 03FF_FFFF, the address accesses memory. If, however, the address is between FF80_FFFF and FFFF_FFFF, I/O is accessed. In the preferred embodiment, all other areas are reserved. It will be obvious to one skilled in the art that other memory maps may be used in conjunction with this invention.

Referring again to FIG. 2, in a preferred embodiment, when MCU 120 decodes the address, it also determines if the address points to one of the reserved areas 230. If one of the reserved areas 230 is pointed to the READ/WRITE is cancelled for both the IOU 130 and the MCU 120.

There is a tradeoff when implementing this invention. Since both MCU 120 and IOU 130 are put into the READ/WRITE mode when only one will be required, power consumption will increase. The increased system performance by allowing a faster clock rate offsets this increase in power consumption for most applications.

CONCLUSION

The present invention, therefore, presents a technique whereby the clock rate of a system can be increased. The increase is accomplished by sending an instruction to the memory and I/O control units to transition to the READ/WRITE state as soon as an OPCODE is decoded indicating that a READ or a WRITE operation is called for, thus removing the state transition time from the critical path.

While the invention has been particularly shown and described with reference to preferred embodiments thereof, it will be understood by those skilled in the art that various changes in form and details may be made therein without departing from the spirit and scope of the invention.

For example the technique of the present invention can be implemented in systems using resource devices other than the MCU and IOU described herein, and the technique of the present invention can be expanded to systems encompassing a multiplicity of resource devices.

What is claimed is:

1. A method for reducing the critical path in a processor-based system during READ/WRITE operations, the system having a memory control unit (MCU), an Input/Output control unit (IOU) and an instruction set, comprising the steps of:

(a) decoding a first part of an instruction from the instruction set;

(b) determining if said instruction requires at least one of a READ and a WRITE operation;

(c) sending a request to both the MCU and the IOU to enter the READ/WRITE state if it is determined in step b that a READ and/or a WRITE is required;

(d) decoding the remainder of the instruction to determine the address(es) to be accessed by the READ and/or WRITE operation;

(e) decoding the address(es) to be accessed, the decoding performed by at least one of the MCU and the IOU to determine whether the access is directed toward memory or I/O devices; and (f) cancelling one of said requests to the MCU and IOU based on the results of said decoding step (e).

2. The method of claim 1 wherein said steps (c) and (d) are performed in parallel.

3. The method of claim 1 wherein the requests in said step (c) are sent simultaneously.

4. A method for reducing the critical path in a processor-based system during resource access operations, the system having a multiplicity of resources and an instruction set, comprising the steps of:

(a) decoding a first part of an instruction from the instruction set;

(b) determining if said instruction requires an access operation;

(c) sending a request to at least two of the resources to enter an access state if it is determined in step b that access to the resources is required;

(d) decoding the remainder of the instruction to determine the address(es) to be accessed;

(e) decoding the address(es) to be accessed, the decoding performed by at least one of the resources to determine which of said at least two of the resources will be accessed; and (f) cancelling the remainder of the requests based on the results of said decoding step (e).

5. The method of claim 4 wherein said steps (c) and (d) are performed in parallel.

6. The method of claim 4 wherein the requests in said step (c) are sent simultaneously.

7. A system for reducing the critical path in a processor-based system during resource access operations, the system having a multiplicity of resources and an instruction set, comprising:

(a) means for decoding a first part of an instruction from the instruction set;

(b) means for determining if said instruction requires an access operation;

(c) means for sending a request to at least two of the resources to enter an access state if it is determined by said means for determining that access to the resources is required;

(d) means for decoding the remainder of the instruction to determine the address(es) to be accessed;

(e) means for decoding the address(es) to be accessed, the decoding performed by at least one of the resources to determine which of said at least two of the resources will be accessed; and (f) means for cancelling the remainder of the requests based on the decoded address(es).

8. The system of claim 7 wherein: said means for determining is a means for determining if said instruction requires at least one of a READ and a WRITE operation;

said means for sending is a means for sending a request to both the MCU and the IOU to enter the READ/WRITE state if it is determined in step b that a READ and/or a WRITE is required;

said means for decoding the remainder of the instruction is a means for decoding the remainder of the instruction to determine the address(es) to be accessed by the READ and/or WRITE operation;

said means for decoding the address(es) is a means for decoding the address(es) to be accessed, the decoding performed by at least one of the MCU and the IOU to determine whether the access is directed toward memory or I/O devices; and said means for cancelling is a means for cancelling one of said requests to the MCU and IOU based on the results of said means for decoding the address(es).

9. The method of claim 4, wherein the resource access operations are READ and/or WRITE operations and the resources are a memory control unit and an Input/Output control unit, and wherein said step (c) is a step for sending a request to both the memory control unit and an Input/Output control unit to enter a READ/WRITE state.

* * * * *